US011081269B2

(12) United States Patent
Frangen

(10) Patent No.: US 11,081,269 B2
(45) Date of Patent: Aug. 3, 2021

(54) MOVEMENT DEVICE COMPOSED OF SUBASSEMBLIES

(71) Applicant: Robert Bosch GmbH, Stuttgart (DE)

(72) Inventor: Joachim Frangen, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 231 days.

(21) Appl. No.: 16/429,688

(22) Filed: Jun. 3, 2019

(65) Prior Publication Data

US 2020/0013530 A1     Jan. 9, 2020

(30) Foreign Application Priority Data

Jun. 13, 2018   (DE) ...................... 10 2018 209 403.9

(51) Int. Cl.
*H01F 7/02* (2006.01)

(52) U.S. Cl.
CPC ......... *H01F 7/0205* (2013.01); *H01F 7/0231* (2013.01); *H01F 7/0242* (2013.01); *H01F 7/0247* (2013.01); *H01F 7/0252* (2013.01)

(58) Field of Classification Search
CPC .... H01F 7/0205; H01F 7/0231; H01F 7/0236; H01F 7/0242; H01F 7/0247; H01F 7/0252; H02K 41/031
See application file for complete search history.

(56) References Cited

U.S. PATENT DOCUMENTS

| 6,615,155 | B2 | 9/2003 | Gilboa | |
|---|---|---|---|---|
| 2018/0223481 | A1* | 8/2018 | Dunham | ............... E01B 25/305 |
| 2019/0074270 | A1* | 3/2019 | Revier | .................. H01L 23/367 |

FOREIGN PATENT DOCUMENTS

| DE | 10 2016 224 951 A1 | 6/2018 |
|---|---|---|
| JP | 2009-254177 A | 10/2009 |
| WO | 2015/017933 A1 | 2/2015 |

OTHER PUBLICATIONS

Wikipedia article; Magnetic moment, https://en.wikipedia.org/wiki/Magnetic_moment, 17 pages; German language article: https://de.wikipedia.org/w/index.php?title=Magnetisches_Dipolmoment.
Wikipedia article; Euler angles, https://en.wikipedia.org/wiki/Euler_angles, 12 pages; German language article: https://de.wikipedia.org/wiki/Eulersche_Winkel.

* cited by examiner

*Primary Examiner* — Ramon M Barrera
(74) *Attorney, Agent, or Firm* — Maginot, Moore & Beck LLP

(57) ABSTRACT

A movement device comprising a first and a second assembly, the first assembly being composed of a plurality of subassemblies. Two directly adjacent subassemblies are conterminous with each other at a boundary line. The two subassemblies form at least one first pair of directly adjacent first permanent-magnet arrangements that are separated from each other by the boundary line. The two first permanent-magnet arrangements of the first pair are each arranged with a boundary distance from the boundary line that is reduced with respect to a spacing distance, such that they mutually have the spacing distance. There are present in each case within the said two subassemblies at least one second pair of directly adjacent first permanent-magnet arrangements that mutually have the spacing distance.

13 Claims, 3 Drawing Sheets

MOVEMENT DEVICE COMPOSED OF SUBASSEMBLIES

This application claims priority under 35 U.S.C. § 119 to patent application number DE 10 2018 209 403.9, filed on Jun. 13, 2018 in Germany, the disclosure of which is incorporated herein by reference in its entirety.

BACKGROUND

The disclosure relates to a movement device according to the following description, and to two methods for the operation thereof. By means of such movement devices, it is possible to keep a second assembly in a floating state with respect to a first assembly solely by magnetic forces and to move it in a controlled manner, the roles of the first and the second assembly also being reversible.

Known from WO 2015/017 933 A1 is a movement device in which the magnetic forces are generated by means of electromagnets. This causes high energy losses.

In the German patent application having the file number 102016224951.7, the applicant has described an entirely new type of movement device, by which it is possible to achieve the function known from WO 2015/017 933 A1 solely by use of permanent magnets. Far less waste heat is thereby produced, and at the same time much greater loads can be kept can be kept in a floating state.

An advantage of the present disclosure consists in that the first assembly can be made very large, without the production of the movement device thereby being rendered substantially more difficult. The position control of the second assembly, which is the subject-matter of a patent applicant by the applicant, submitted on the same date, is substantially unimpaired.

SUMMARY

According to the following description, the movement device according to the disclosure differs from the movement device according to DE102016224951.7 in that two directly adjacent subassemblies are conterminous with each other at a boundary line, the said two subassemblies forming at least one first pair of directly adjacent first permanent-magnet arrangements that are separated from each other by the boundary line, the two first permanent-magnet arrangements of the first pair each being arranged with a boundary distance from the boundary line that is reduced with respect to a spacing distance, such that they mutually have the spacing distance, there being present in each case within the said two subassemblies at least one second pair of directly adjacent first permanent-magnet arrangements that mutually have the spacing distance. The said spacing distances are preferably used in the course of the position control of the second assembly, in order to calculate the magnetic forces, occurring during operation, between the first and the second assembly. The subdivision, according to the disclosure, of the first assembly into subassemblies has the result that the division of the first assembly into subassemblies does not have to be taken into account in the context of this calculation. The calculation is therefore simplified substantially.

During the operation of the movement device, the first and the second assembly are preferably arranged at such a short distance from each other that magnetic forces, which are strong enough to hold the two assemblies at a distance, or in the floating state, against the action of gravity, can be set between the second permanent-magnet arrangement and at least part of the first permanent-magnet arrangements. The first assembly can preferably be moved relative to the first assembly by adjusting the first permanent-magnet arrangements.

The subassemblies preferably abut one another at the boundary line, where most preferably there is no gap.

The movement device may comprises a single first assembly and at least one second assembly, the first assembly, in particularly the first base, being fixedly arranged in the sense of a stator, while the at least one second assembly is in each case individually movable with respect to the first assembly, such that it can be used, for example, as a workpiece carrier, or as a transport body.

The movement device may comprise at least one first assembly and a single second assembly, the second assembly, in particular the second base, being fixedly arranged in the sense/manner of a stator, while the at least one first assembly is in each case individually movable relative to the second assembly, such that it can be used, for example, as a workpiece carrier, or as a transport body. The assembly, or the workpiece carrier, that is other than the stator can preferably be moved at a distance from the stator, or in a freely floating manner.

The subassemblies are preferably realized such that they are substantially identical to each other. Differences between the subassemblies may exist, for example, in respect of the assignment of a unique identification, in order that the subassemblies can be distinguished in the context of position control.

A permanent-magnet arrangement preferably comprises at least two magnetic dipoles, which are each arranged in pairs at a fixed distance and with a fixed rotary position relative to each other. It is understood in this case that, technically, an ideal magnetic dipole can only be realized approximately. In the case of a preferred embodiment of the disclosure, it is sufficient if the formulae for the forces and torques between two magnetic dipoles, which can be retrieved from the Internet address https://de.wikipedia.org/w/index.php?title=Magnetisches Dipolmoment, or equivalent simplified approximation formulae, or value tables, can be used. Preferably, the permanent-magnet arrangements are each composed of a plurality of separate single magnets, which each form a single magnetic dipole. A particularly good approximation of the said formulae can thereby be achieved in a simple manner.

The actuators preferably each have a single degree of freedom, most preferably an endless rotational degree of freedom. The actuators are preferably embodied as electric motors, most preferably as brushless direct-current motors. The first permanent-magnet arrangements are preferably fixedly connected to a drive shaft of an associated electric motor. The drive shafts, or their rotational axes, are preferably oriented perpendicularly in relation to a movement surface of the first base that faces toward the second assembly.

Advantageous developments and improvements of the disclosure are specified in the following description.

It may be provided that the subassemblies together form a gap-free movement surface of the first base that faces toward the second assembly. The movement surface is realized, in particular, such that it is gap-free at the boundary lines. It is conceivable for the movement surface to have relatively large free spaces, which result from the fact that locations that could be occupied by a subassembly are not occupied by a subassembly. The movement surface is preferably flat. The movement surface may have a spatial curvature without kinks. The movement surface may be composed of a plurality of flat partial surfaces, each having a different orientation, which are each conterminous, in pairs, with a boundary line. The movement surface may be aligned perpendicularly in relation to the direction of gravity, the alignment being freely selectable. Within a subassembly, the movement surface is preferably uninterrupted.

It may be provided that the actuators each have a single endless rotational degree of freedom, which defines a rotational axis, the rotational axis in each case being aligned substantially perpendicularly in relation to a movement surface of the first base, such that it intersects the latter, the spacing distance being measured at the corresponding intersection points. This results in an exact definition of the spacing distance.

It may be provided that the spacing distance of the first and second pair is measured along a common axis. Preferably, the respective boundary line intersects the said common axis.

It may be provided that there is a first and a second axis that intersect at an angle other than zero, at least one first and a plurality of second pairs of first permanent-magnet arrangements being assigned both to the first and to the second axis. In respect of movements, the advantages according to the disclosure are thus present with regard to both said axes. The first and the second axis preferably intersect at an angle of 90°. The spacing distances assigned to the first and the second axis are preferably equal, but may also differ.

It may be provided that the boundary distance is equal to half the spacing distance. All subassemblies can thus be realized such that they are largely identical. The advantages according to the disclosure are nevertheless present, no matter how the subassemblies are fitted to each other to obtain a large first assembly.

It may be provided that assigned to each subassembly is a separate subsidiary control device, to which the actuators of this subassembly are connected, the subsidiary control devices being connected, at least indirectly, for the purpose of data exchange. For each assigned actuator, the subsidiary control devices preferably comprise a position feedback controller, in particular a rotary position feedback controller. The data exchange connection may be wired, for example by means of electrical leads or fiber-optic conductors. It may also be wireless, for example with the use of radio waves or the use of inductively coupled coils. The data exchange connection may be effected with the use of standardized bus protocols, such as 12C, SPI, CAN, Interbus, Profibus, etc.

It may be provided that at least one subsidiary control device is connected for the purpose of data exchange only to the subsidiary control devices that are arranged in directly adjacently arranged subassemblies. This results in a particularly small wiring requirement. Consideration may be given, for example, to attaching corresponding plug-in connectors to the housings of the subassemblies, which come into engagement with each other when the subassemblies are fitted to each other. Preferably, subsidiary control devices are connected for the purpose of data exchange, as described above.

It may be provided that all subsidiary control devices are connected to a common main control device for the purpose of data exchange. Preferably, the control tasks that cannot be performed by a subsidiary control device, by means of its locally ascertained or available data, are performed in the main control device. To be considered in this case, for example, is the execution of a movement path over a plurality of subassemblies.

A position determination device may be provided, each subassembly comprising a part of this position determination device. The position determination device may be realized, for example, according to U.S. Pat. No. 6,615,155 B2.

It may be provided that each subassembly is provided with a separate cooling device, a plurality of cooling devices, preferably all, being connected to a common coolant supply and/or to a common coolant discharge. The waste heat that is produced in the actuators and/or the subsidiary control devices can thereby be removed without difficulty. In the case of the first assembly being assembled from the subassemblies, there is only a small resource requirement in respect of cooling. Only the coolant supply has to be connected.

Protection is additionally set forth for a method for operating a movement device according to the disclosure, the data exchange between the subsidiary control devices being based on a constant timing. As a result, the time that the position feedback control of the second assembly requires to react to a malfunction can be limited to a maximum value. Moreover, the data exchange procedure is simplified. The timing of all subassemblies is preferably synchronous.

Protection is additionally set forth for a further method for operating a movement device according to the disclosure, data being exchanged between the subassemblies in the course of position determination.

It is understood that the features cited above and those yet to be explained in the following are applicable, not only in the respectively specified combination, but also in other combinations or singly, without departure from the scope of the present disclosure.

BRIEF DESCRIPTION OF THE DRAWINGS

The disclosure is explained in greater detail in the following on the basis of the appended drawings. Therein.

DETAILED DESCRIPTION

Figure 1:
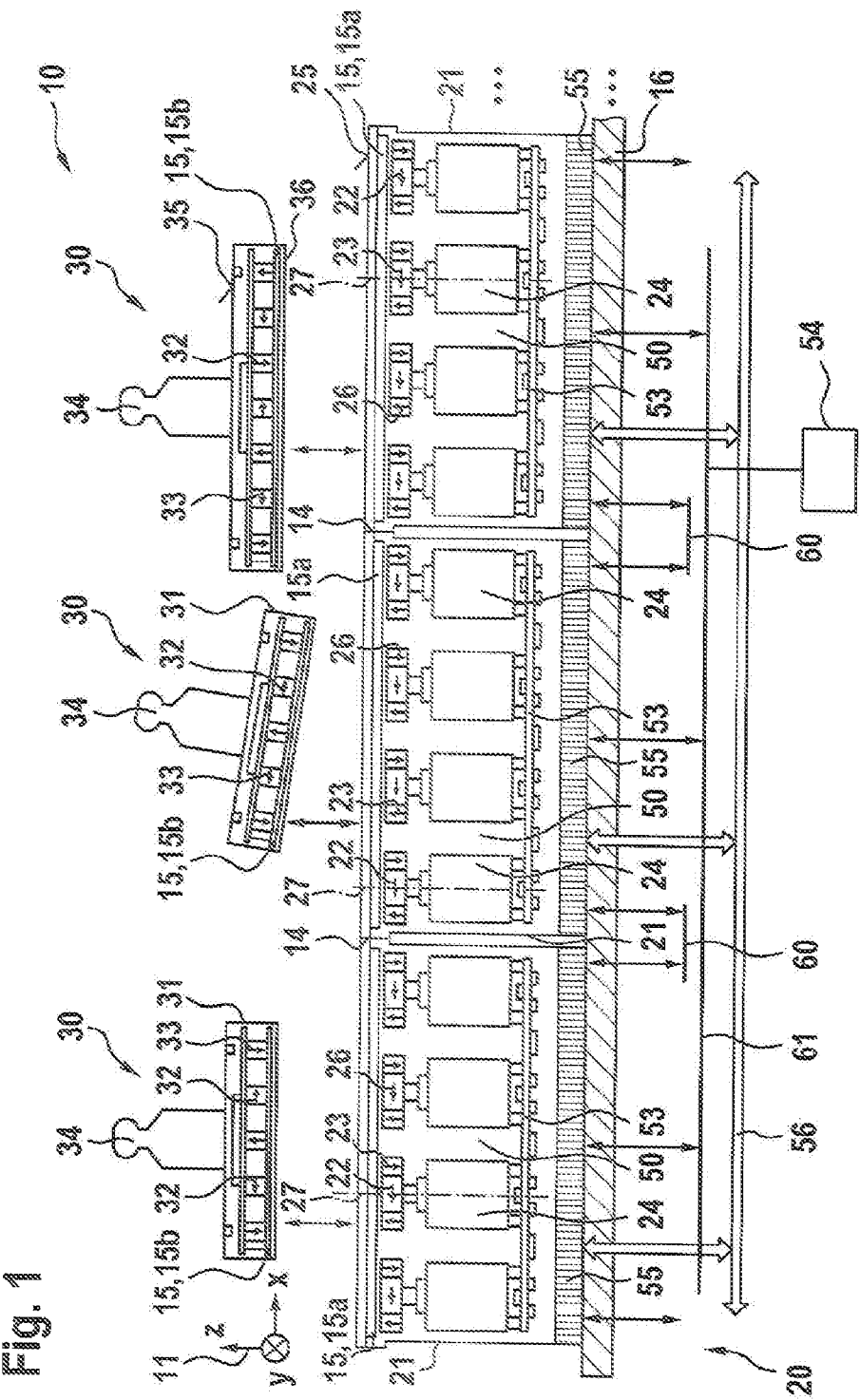
FIG. 1 shows a basic schematic sectional view of a movement device according to the disclosure.

FIG. 1 shows a basic schematic sectional view of a movement device 10 according to the disclosure. In this case, the movement device 10 comprises a single first assembly 20 and three second assemblies 30, the first assembly 20 being embodied in the manner of a fixed stator, the second assemblies 30 being embodied in the manner of a movable workpiece carrier, or a transport body. In respect of its movement surface 25, the stator is typically larger than the workpiece carrier. The assignment of first and second assembly to the stator and workpiece carrier may also be selected inversely. The assembly that is other than the stator may be present singly or in multiples.

The first assembly 20 comprises a base 21, which is formed by a plurality of subassemblies 50, namely, by their housings. The housings of the different subassemblies 50 are preferably mounted on a common base plate 16, so that the subassemblies 50 are precisely aligned in relation to each other.

In this case, the upper side of the base 21 forms a closed, flat movement surface 25, along which the second assemblies 30 can be moved in a freely floating manner. The subassemblies 50, in particular their respective housings, accordingly are mutually conterminous, substantially without any gap, at boundary lines 14. In this case, the movement surface 25 is aligned perpendicularly in relation to the direction of gravity, the alignment being freely selectable. In particular, the arrangement according to FIG. 1 can be operated inverted by 180°. The movement surface 25 can extend with largely any spatial curvature.

Arranged within the first base 21 are a plurality of first permanent-magnet arrangements 22, which are each connected to the first base 21 via an assigned actuator 24. In each case, a plurality of first permanent-magnet arrangements 22, with the respectively assigned actuators 24, are arranged in each subassembly 50. Preferably, the first permanent-magnet arrangements 22 are identical with each other, and each comprise three first single magnets 23, which are arranged next to each other in a row. The first single magnets 23 each have a magnetic field that approximates to that of a magnetic dipole, at least at some distance. The corresponding dipole vectors 26 are arranged in the manner of a Halbach array, such that a particularly strong magnetic field is obtained toward the second assembly 30. The distance of a first permanent-magnet arrangement 22 from the movement surface 25 is selected so as to be equal in each case, for all permanent-magnet arrangements 22.

The actuators 24 in this case are realized as electric motors, in particular as brushless direct-current motors. They accordingly have a single, endless rotational degree of freedom, the corresponding rotational axis 27 being aligned perpendicularly in relation to the movement surface 25. The drive shaft of the electric motor is fixedly connected to the first single magnets 23, such that the latter form a substantially rigid unit, which is rotatable as a whole with respect to the respective rotational axis 27. The rotational axis 27 is arranged in the centre of the assigned first permanent-magnet arrangement 22.

Figure 3:
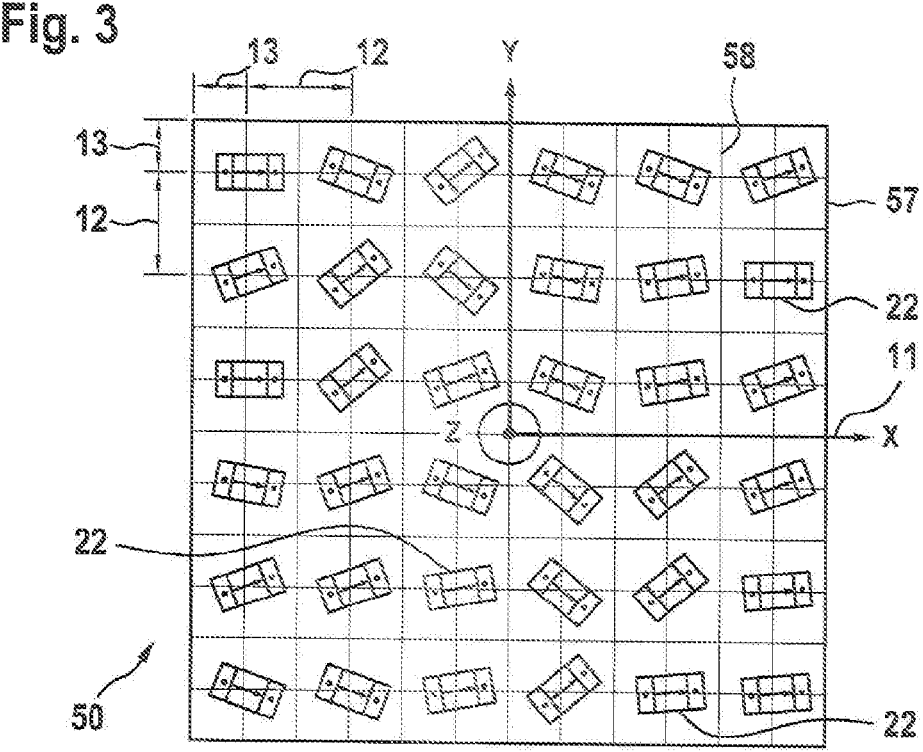
FIG. 3 shows a basic schematic plan view of a single subassembly.
Figure 4:
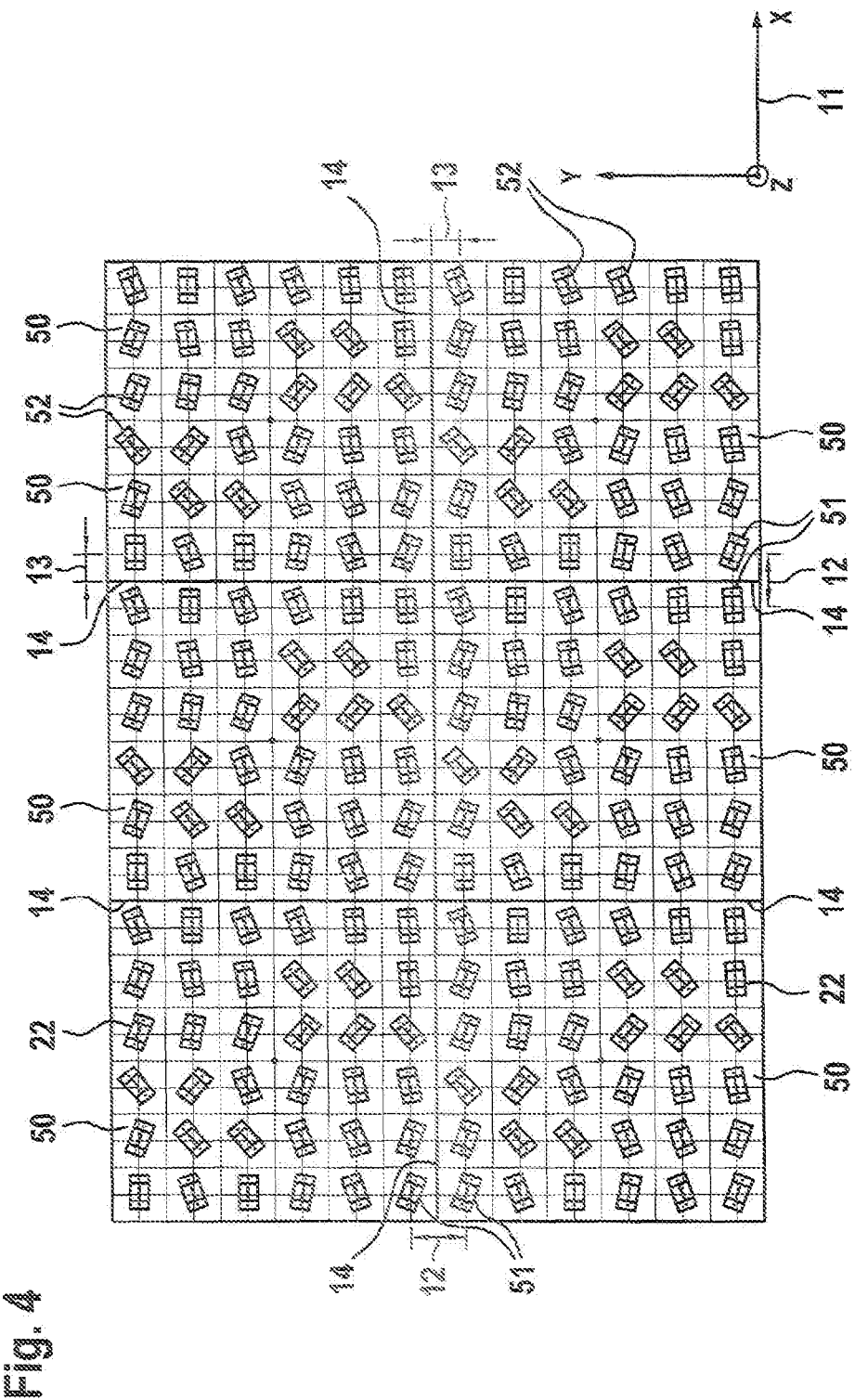
FIG. 4 shows a view, corresponding to FIG. 4, of the entire first assembly.

The first assembly 20 preferably comprises a multiplicity of first permanent-magnet arrangements 22, having assigned actuators 24, which are arranged, distributed in a two-dimensional grid, over the movement surface 25, reference being made to the explanations relating to FIGS. 3 and 4 for further details.

Assigned to the first assembly 20 is a Cartesian coordinate system 11, the first and second axis X; Y of which are aligned parallel to the movement surface 25, its third axis Z being aligned perpendicularly in relation to the movement surface 25.

In this case, the second assembly 30 is embodied in the manner of a workpiece carrier, and may be realized as any transport body. It comprises a second base 31, which in this case is embodied in the form of a flat plate of a constant thickness, having a flat upper side and flat underside 35; 36. The upper side 35 serves to receive a payload 34, and may be configured largely in any manner. The underside 36 facing toward the first assembly 20 is preferably matched to the movement surface 25, and in particular it is to be possible to bring the underside 36 into direct bearing contact with the movement surface 25, such that the second assembly 30 is supported in a stable manner on the first assembly 20, in particular when the movement device 10 is in the de-energized state.

In this case, the second base 31 has a square contour in plan view, with rectangular, circular or other contours also being conceivable. The second assembly 30 comprises a second permanent-magnet arrangement 32, which is arranged in a fixed manner relative to the second base 31. The second permanent-magnet arrangement 32 comprises a plurality of second single magnets 33, the magnetic field of which approximates to that of a magnetic dipole, at least at some distance. A possible arrangement of the second single magnets 33 is explained in greater detail with reference to FIG. 2. The second single magnets 33 are arranged as closely adjacent as possible to the underside 36, such that strong magnetic forces can be set toward the first permanent-magnet arrangements 22.

Further, the movement device 10 comprises a position determination device 15, which is embodied, for example, in accordance with U.S. Pat. No. 6,615,155 B2, and being arranged partly 15a in the first and partly 15b in the second assembly 20; 30. In this case, a part 15a of the position determination device 15 is arranged in each subassembly 50. The position determination device 15 operates inductively. It comprises planar coils in the first assembly 20, which are arranged in a distributed manner over the entire movement surface 25. Further, there are coils provided in the second assembly 30. By means of this position determination device 15 it is possible to determine, for example, the three location coordinates X, Y, Z of the second assembly 30 with respect to the coordinate system 11, and in addition, for example, three Euler angles (https://de.wikipedia.org/wiki/EulerscheWinkel) with respect to the coordinate system 11.

The arrows denoted by the number 60 indicate the data exchange connection between two directly adjacent subassemblies 50. Assigned to each subassembly 50 is a subsidiary control device 53, which is embodied, for example, in the form of an electronic printed circuit board. Connected to the subsidiary control device 53 there are, inter alia, the actuators 24 of the subassembly 50 and the part 15a of the position determination device that is arranged in the subassembly 50. The subsidiary control devices 53 are connected for the purpose of data exchange 60 to the respectively directly adjacent subsidiary control devices 53. If a data exchange is wanted between subsidiary control devices 53 arranged farther apart from each other, this can be effected via subsidiary control devices 53 interposed therebetween. Standardized bus protocols are preferably used for this purpose.

The arrows denoted by the number 61 indicate the data exchange connection between a main control device 54 and the subsidiary control devices 53. For example, the position determination that accesses measurement data from a plurality of subsidiary control devices 53 may be performed in the main control device 54. Further, at least part of the position feedback control of the second assemblies 30 may be performed there.

Each subassembly 50 is provided with a separate cooling device 55. This cooling device 50 is intended to remove the waste heat produced in the actuators 24 and/or in the subsidiary control device. The cooling device 55 may be embodied in the form of an air cooling system. If this cooling power is insufficient, the cooling device 55 may be embodied in the form of a liquid cooling system. The cooling devices 55 of the different subassemblies 50 are then preferably connected to a common coolant supply, via which the coolant is supplied and discharged.

Figure 2:
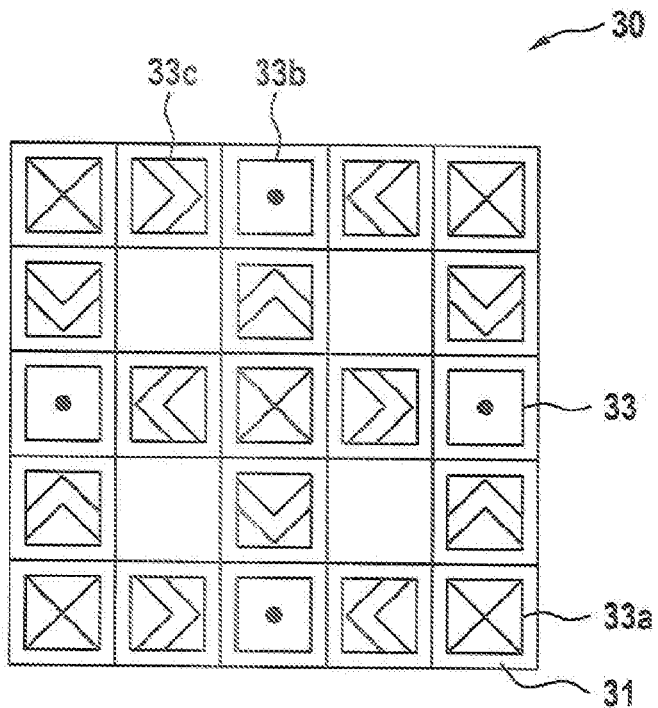
FIG. 2 shows a basic schematic plan view of a second assembly.

FIG. 2 shows a basic schematic plan view of the second assembly 30. The plane of the drawing is aligned parallel to the underside (number 36 in FIG. 1) of the second assembly, the viewing direction being toward the first assembly. The second single magnets 33 are arranged in a distributed manner, distributed over the entire underside of the second base 31. Their dipole vectors each have one of six different possible arrangements, which are aligned in pairs perpendicularly or parallelwise. The dipole vectors of the second single magnets 33 that are denoted by the symbol according to number 33a are directed perpendicularly away from the underside. The dipole vectors of the second single magnets 33 that are denoted by the symbol according to number 33b are directed perpendicularly toward the underside. The dipole vectors of the second single magnets 33 that are denoted by the symbol according to number 33c are directed parallel to the underside, in the arrow direction. The arrangement and orientation of the second single magnets 33 is preferably selected according to a Halbach array, such that a particularly strong magnetic field is obtained toward the first assembly.

Otherwise, the precise arrangement of the second single magnets 33 is rather secondary. What is paramount is that the arrangement and the alignment of the second single magnets 33 relative to the second base 31 is known, such that they can be used in the course of the position feedback control of the second assembly, in particular in the course of the calculation of the magnetic forces.

It is understood that, instead of second single magnets 33, a single-piece second permanent-magnet arrangement may be used, which is magnetized in an analogous manner. This may be produced, for example, by 3D printing, the corresponding plastic forming a binder for permanent-magnet particles. In the context of series production, however, a magnetic field that can be reproduced with very small tolerances, and that is also very strong, can be produced very much more easily with single magnets. Further, with single magnets it is very much easier to generate a magnetic field that can be described, with a good approximation, by the formulae for an ideal magnetic dipole.

FIG. 3 shows a basic schematic plan view of a single subassembly 50. In this case the subassembly 50 has a square housing contour 57, the side lines of which are aligned parallel to the first and the second axis X, Y of a Cartesian coordinate system 11. The four side lines of the housing contour 57 form potential boundary lines (number 14 in FIG. 4) between two directly adjacent subassemblies 50, since the subassemblies 50 can be fitted to each other in any manner at their side lines. It is to be noted that rectangular or hexagonal housing contours 57 may be used.

Drawn with thin, unbroken lines in FIG. 3, within the housing contour 57, is a coordinate grid 58 that is aligned parallel to the coordinate system 11. In the direction of the first and the second axis X, Y, the coordinate grid 58 in each case has a constant grid distance, which corresponds to the boundary distance 13. The housing contour 57 coincides with the grid lines of the coordinate grid 58. The rotational axes (number 27 in FIG. 1) of the first permanent-magnet arrangements 22 are each arranged precisely on an intersection point between two intersecting grid lines.

Two directly adjacent first permanent-magnet arrangements 22 have a distance of two grid lines, such that their spacing distance 12 is equal to twice the boundary distance 13. The spacing distance 12 is selected so as to be equal with respect to the first and the second axis S, Y. Corresponding to this spacing distance 12, the coordinate grid 58 is gaplessly occupied by first permanent-magnet arrangements 22, such that substantially equally strong magnetic forces, which support the second assembly in a freely floating manner, can be set everywhere.

FIG. 4 shows a view of the entire first assembly 20, corresponding to FIG. 3. In this case, the first assembly 20 is composed of six subassemblies 50, but may be composed of any number of subassemblies 50. In the case of large movement devices it is conceivable that free spaces, which are not occupied by subassemblies, remain on the inside, such that other devices can be installed there, for example machining devices, which machine the workpieces that are transported by the second assemblies.

In FIG. 4, all boundary lines between two directly adjacent subassemblies are denoted by the reference 14. Corresponding to the square housing contour (number 57 in FIG. 3), these are aligned straight and parallel to an assigned axis X, Y of the coordinate system 11. Obtained in the region of the boundary lines 14 are first pairs 51 of first permanent-magnet arrangements 22 that are separated from each other by the respective boundary line 14. These first pairs 51 also mutually have the spacing distance 12, which all second pairs 52 inside a subassembly 50 also have. In the course of the position feedback control of the second assemblies, therefore, it is not necessary to take account of whether the respective second assembly is located inside a subassembly 50 or whether it is just over a boundary line 14 between two subassemblies 50. The division of the first assembly 20 into subassemblies 50 has virtually no effect upon the movement of the second assembly relative to the first assembly 20.

REFERENCES

X first axis
Y second axis
Z third axis
10 movement device
11 coordinate system
12 spacing distance
13 boundary distance
14 boundary line
15 position determination device
15a part of the position determination device in the first assembly
15b part of the position determination device in the second assembly
16 base plate
20 first assembly
21 first base
22 first permanent-magnet arrangement
23 first single magnet
24 actuator
25 movement surface
26 dipole vector
27 rotational axis
30 second assembly
31 second base
32 second permanent-magnet arrangement
33 second single magnet
33a second single magnet having dipole vector perpendicularly away from the underside
33b second dipole magnet having dipole vector perpendicularly toward the underside
33c second single magnet having dipole vector parallel to the underside, in arrow direction
34 payload
35 upper side
36 underside
50 subassembly
51 first pair of first permanent-magnet arrangements
52 second pair of first permanent-magnet arrangements
53 subsidiary control device
54 main control device
55 cooling device
56 coolant supply
57 housing contour 58 coordinate grid
60 data exchange connection between the subsidiary control devices
61 data exchange connection between the main control device and the subsidiary control devices

What is claimed is:

1. A movement device, comprising:
a first and a second assembly, the first assembly comprising a first base and a plurality of first permanent-magnet arrangements, the first permanent-magnet arrangements being connected to the first base, via a respectively assigned actuator, in such a manner that they are each movable as a whole in at least one degree of freedom, by the assigned actuator, relative to the first base, the second assembly comprising a second base and a second permanent-magnet arrangement, the second permanent-magnet arrangement being arranged in a fixed manner relative to the second base, the first assembly being composed of a plurality of subassemblies, which each form an assigned part of the first base, and they each comprise a plurality of first permanent-magnet arrangements having the respectively assigned actuator, wherein:
two directly adjacent subassemblies are conterminous with each other at a boundary line, the said two subassemblies forming at least one first pair of directly adjacent first permanent-magnet arrangements that are separated from each other by the boundary line, the two first permanent-magnet arrangements of the first pair each being arranged with a boundary distance from the boundary line that is reduced with respect to a spacing distance, such that they mutually have the spacing distance, there being present in each case within the said two subassemblies at least one second pair of directly adjacent first permanent-magnet arrangements that mutually have the spacing distance.

2. The movement device according to claim 1, wherein the subassemblies together form a gap-free movement surface of the first base that faces toward the second assembly.

3. The movement device according to claim 1, wherein: the actuators each have a single endless rotational degree of freedom, which defines a rotational axis, the rotational axis in each case being aligned substantially perpendicularly in relation to a movement surface of the first base, such that it intersects the latter, the spacing distance being measured at the corresponding intersection points.

4. The movement device according to claim 1, wherein: the spacing distance of the first and second pair being measured along a common axis.

5. The movement device according to claim 4, wherein: there is a first axis and a second axis that intersect at an angle other than zero, at least one first and a plurality of second pairs of first permanent-magnet arrangements being assigned both to the first axis and to the second axis.

6. The movement device according to claim 1, wherein: the boundary distance is equal to half the spacing distance.

7. The movement device according to claim 1, wherein: there is assigned to each subassembly a separate subsidiary control device, to which the actuators of this subassembly are connected, the subsidiary control devices being connected, at least indirectly, for data exchange.

8. The movement device according to claim 7, wherein: at least one subsidiary control device is connected for data exchange only to the subsidiary control devices that are arranged in directly adjacently arranged subassemblies.

9. The movement device according to claim 7, wherein: all subsidiary control devices are connected to a common main control device for data exchange.

10. The movement device according to claim 1, further comprising:
a position determination device, each subassembly comprising a part of this position determination device.

11. The movement device according to claim 1, wherein each subassembly is provided with a separate cooling device, a plurality of cooling devices, preferably all, being connected to a common coolant supply and/or to a common coolant discharge.

12. A method for operating a movement device, comprising:
basing data exchange between subsidiary control devices a constant timing, wherein:
a first and a second assembly, the first assembly comprising a first base and a plurality of first permanent-magnet arrangements, the first permanent-magnet arrangements being connected to the first base, via a respectively assigned actuator, in such a manner that they are each movable as a whole in at least one degree of freedom, by the assigned actuator, relative to the first base, the second assembly comprising a second base and a second permanent-magnet arrangement, the second permanent-magnet arrangement being arranged in a fixed manner relative to the second base, the first assembly being composed of a plurality of subassemblies, which each form an assigned part of the first base, and they each comprise a plurality of first permanent-magnet arrangements having the respectively assigned actuator,
two directly adjacent subassemblies are conterminous with each other at a boundary line, the said two subassemblies forming at least one first pair of directly adjacent first permanent-magnet arrangements that are separated from each other by the boundary line, the two first permanent-magnet arrangements of the first pair each being arranged with a boundary distance from the boundary line that is reduced with respect to a spacing distance, such that they mutually have the spacing distance, there being present in each case within the said two subassemblies at least one second pair of directly adjacent first permanent-magnet arrangements that mutually have the spacing distance, and
there is assigned to each subassembly a separate subsidiary control device, to which the actuators of this subassembly are connected, the subsidiary control devices being connected, at least indirectly, for data exchange.

13. A method for operating a movement device, comprising:
exchanging data between subassemblies in the course of position determination, wherein:
a first and a second assembly, the first assembly comprising a first base and a plurality of first permanent-magnet arrangements, the first permanent-magnet arrangements being connected to the first base, via a respectively assigned actuator, in such a manner that they are each movable as a whole in at least one degree of freedom, by the assigned actuator, relative to the first base, the second assembly comprising a second base and a second permanent-magnet arrangement, the second permanent-magnet arrangement being arranged in a fixed manner relative to the second base, the first assembly being composed of a plurality of subassemblies, which each form an assigned part of the first base, and they each comprise a plurality of first permanent-magnet arrangements having the respectively assigned actuator, two directly adjacent subassemblies are conterminous with each other at a boundary line, the said two subassemblies forming at least one first pair of directly adjacent first permanent-magnet arrangements that are separated from each other by the boundary line, the two first permanent-magnet arrangements of the first pair each being arranged with a boundary distance from the boundary line that is reduced with respect to a spacing distance, such that they mutually have the spacing distance, there being present in each case within the said two subassemblies at least one second pair of directly adjacent first permanent-magnet arrangements that mutually have the spacing distance, and there is assigned to each subassembly a separate subsidiary control device, to which the actuators of this subassembly are connected, and all subsidiary control devices are connected to a common main control device for data exchange.

* * * * *